(12) United States Patent
Kuvent et al.

(10) Patent No.: US 11,656,991 B2
(45) Date of Patent: May 23, 2023

(54) DEVICE AND METHOD FOR MAINTAINING SUMMARY CONSISTENCY IN CACHES

(71) Applicant: Huawei Technologies Co., Ltd., Shenzhen (CN)

(72) Inventors: Aviv Kuvent, Hod Hasharon (IL); Yair Toaff, Hod Hasharon (IL)

(73) Assignee: Huawei Technologies Co., Ltd., Shenzen (CN)

( * ) Notice: Subject to any disclaimer, the term of this patent is extended or adjusted under 35 U.S.C. 154(b) by 0 days.

(21) Appl. No.: 17/567,675

(22) Filed: Jan. 3, 2022

(65) Prior Publication Data
US 2022/0121575 A1    Apr. 21, 2022

Related U.S. Application Data

(63) Continuation of application No. PCT/EP2019/067813, filed on Jul. 3, 2019.

(51) Int. Cl.
*G06F 12/00*       (2006.01)
*G06F 12/0837*   (2016.01)
*G06F 12/0842*   (2016.01)

(52) U.S. Cl.
CPC ...... *G06F 12/0837* (2013.01); *G06F 12/0842* (2013.01); *G06F 2212/608* (2013.01)

(58) Field of Classification Search
CPC ............. G06F 12/0837; G06F 12/0842; G06F 2212/608
See application file for complete search history.

(56) References Cited

U.S. PATENT DOCUMENTS

| | | |
|---|---|---|
| 5,809,542 A | 9/1998 | Tsuboi et al. |
| 2010/0257385 A1 | 10/2010 | Hutchison et al. |
| 2015/0242321 A1 | 8/2015 | Iyigun et al. |
| 2017/0010982 A1 | 1/2017 | Avanzi et al. |

*Primary Examiner* — Gurtej Bansal
(74) *Attorney, Agent, or Firm* — Leydig, Voit & Mayer, Ltd.

(57) ABSTRACT

An information processing device comprises: a memory comprising a cache for storing information related to an object from a plurality of objects, and a summary structure configured to store a summary for the object; a volume configured to store a merge file including the plurality of objects, and a set of dump-files, each dump-file being associated with a specific cache-dump operation of the cache; and a processor configured to assign, to the cache, a first identifier; perform a cache-dump operation based on generating a dump-file associated with the first identifier and storing the information related to the object from the cache to the generated dump-file; and assign, to the cache, a second identifier, wherein the second identifier is larger than the first identifier.

19 Claims, 6 Drawing Sheets

A # DEVICE AND METHOD FOR MAINTAINING SUMMARY CONSISTENCY IN CACHES

CROSS-REFERENCE TO RELATED APPLICATIONS

This application is a continuation of International Application No. PCT/EP2019/067813, filed on Jul. 3, 2019, which is hereby incorporated by reference in its entirety.

FIELD

The present disclosure relates to information processing devices and methods, and more particularly, to a device and a method for maintaining summary consistency in a high performance cache.

BACKGROUND

Generally, a cache is a structure that enables performance enhancing on objects, by holding them in a memory. However, the problem with caches is maintaining high performance when a memory allocated for a cache runs out (e.g., due to a need to access a very large number of objects), and swapping to disk has to take place. When the access pattern is random, the swapping to disk becomes a critical problem, since it has to be done in almost every access. For example, caching of data containers Metadata (MD), there is a very large number of containers (millions of them, 10 KB of Metadata each). Moreover, during a deduplication process, these containers metadata structures need to be accessed in a random read pattern.

There are several conventional methods that help with the swapping problem as follows:

Holding in cache summaries of objects (for reads) and actions on objects (for updates, i.e., transactions log).

For example, the actions may be operations on the objects, like adding references to the container MD, adding or deleting data from the container, and other operations that actually change the container or its MD. The transaction log is a list of all of these operations written according to the execution order. Moreover, the summaries can be information like the total used container size, is the container read-only, and other information that takes up very small size and can be held in memory for all of the objects without taking too much of the memory.

Double-caching, which enables swapping updates to disk and applying the updates to the objects in the background.

For example, the double caching is a method of using two cache objects, one of them being active while certain operations are performed on the other cache in the background without delaying the active cache.

However, conventional devices and methods have the disadvantage that when holding in cache operations on objects for updates, and summaries of objects for reads, accessing the full object on disk is required to ensure consistency of the summary. Thus, it has a very high impact on performance, i.e., reduces the performance of the cache.

SUMMARY

In view of the above-mentioned problems and disadvantages, embodiments of the present disclosure provide an improvement over the conventional devices and methods. Embodiments of the disclosure solve the consistency problem by assigning increasing identifiers (ID) to caches dumped (i.e., the transaction logs), and using the identifiers to prevent an inconsistent summary.

A first aspect of the disclosure provides a device comprising a memory comprising one or more caches configured to store information related to at least one object from a plurality of objects, and a summary structure configured to store at least one summary for at least one object from the plurality of objects; and a storage comprising a volume configured to store at least one merge file including the plurality of objects, and a set of dump-files, each dump-file being associated with a specific cache-dump operation of the one or more caches; wherein the device is further comprising a processor configured to assign, to a cache from the one or more caches, a first identifier; perform a cache-dump operation based on generating a dump-file associated with the first identifier and storing the information related to the at least one object from the cache to the generated dump-file; and subsequently assign, to the cache from the one or more caches, a second identifier, wherein the second identifier is larger than the first identifier.

The device of the first aspect may retain the high-performance benefits of a conventional device in updating objects and summary queries, while at the same time advantageously ensuring the consistency of the summaries. This is achieved by assigning different identifiers (for example, by adding an ever-increasing identifier) to each cache dumped (also hereinafter referred to a cache-dump operation), and to the current active cache, and by using the identifiers to maintain summary consistency when applying the transactions to the objects.

For example, the device may comprise one or more caches. Moreover, the device may assign the first identifier to a cache, and may further perform a cache dump-operation. A cache-dump operation may be an operation performed by the device, in which the information of the cache is dumped (stored) in a file. For example, the device may generate a file that may be defined as dump-file, i.e., a file which is generated for a specific cache-dump operation. The device may assign the first identifier to the cache and may further perform the cache-dump operation, e.g., by storing the information of the cache in the generated dump-file and assigning the first identifier to the generated dump-file. Afterwards, the device may assign the second identifier to the cache. Moreover, the second identifier is larger from the first identifier. The device assigns identifiers that are constantly increased.

For example, in some embodiments, the identifiers may increase by adding an increment (e.g., adding 1 to previous identifier), a specific number, the system's time, any other number that is increasing, etc.

Moreover, each object from the plurality of objects may have their own ID and may be identified, as it is generally known to skilled person. In the following, the identifiers for the objects are referred to as object ID.

In some embodiments, the device may use several performance-enhancing operations, for example, performing transaction logs in order to reduce cache size, holding all the object summaries in the caches (i.e., first memory), double-caching, swapping to disk and merging in the background, etc.

In an implementation form of the first aspect, the device is further configured to add the generated dump-file to the set of dump-files.

In a further implementation form of the first aspect, the device is further configured to merge the set of dump-files to the at least one merge file.

This is beneficial, since it may increase the performance of the caches.

In a further implementation form of the first aspect, the cache-dump operation is periodically performed at a time interval of N seconds; and/or the cache-dump operation is performed when the stored capacity of the cache reaches a predefined threshold.

In a further implementation form of the first aspect, the merging is periodically performed at time intervals of M seconds; wherein M is equal to or greater than N.

In a further implementation form of the first aspect, the device is further configured to, if a given dump-file storing information related to a determined object is merged from the set of dump-files to the at least one merge file, update the at least one summary for the determined object; and associate the updated at least one summary with the identifier of the given dump-file.

This is beneficial, because it may allow maintaining critical consistency of summaries (preventing data loss), while ensuring high performance of operations (both updates and summary queries).

In a further implementation form of the first aspect, the device is further configured to, if a given cache-dump operation assigned with a given identifier changes information related to a determined object, update the at least one summary for the determined object; and associate the at least one summary with the assigned identifier of the given cache-dump operation.

In a further implementation form of the first aspect, each summary for the at least one object comprises:
  a summary information related to the at least one object;
  an ID-1 information indicating an identifier of a dump-file for which the summary is updated; and
  an ID-2 information indicating an identifier of a cache-dump operation that changed the at least one object.

In a further implementation form of the first aspect, the device is further configured to assign each summary in the summary structure to a regular summary group representing a type of summary resulting in a non-critical error in the case of an inconsistency in the summary; or a critical summary group representing a type of summary resulting in a critical error in the case of an inconsistency in the summary.

For example, in some embodiments, the device may divide the summaries into two types including a regular summary which may be a summary that effects the behavior of the user, but inconsistency will not result in critical errors, and a critical summary which may be a summary that can result in critical errors if being inconsistent. For example, ref-count of an object, where the summary query is whether the ref-count is 0 (whether the object can be deleted). In this example, a critical summary is when ref-count is 0.

In a further implementation form of the first aspect, the device is further configured to compare, for a determined summary, the identifier indicated in ID-1 with the identifier indicated in ID-2, and assign, when performing the merging operation, the determined summary to the critical summary group, when determining that the identifier indicated in ID-1 is larger or equal to the identifier indicated in ID-2.

For example, in some embodiments, when an operation on an object changes the object in a way that prevents the summary from becoming a critical summary (such as the inc-ref-count), the device may mark the object's summary in the summary structure (which is stored in memory) with the identifier of the dump-file identifier. Moreover, the merge operation (for example, on dump-files up to id=K) will change the summary to critical after checking in the summary structure for indication on operations done on the object with smaller identifiers (i.e., id<=K).

For instance, in some embodiments, when merging dump-files with identifiers up to K, the device may change summaries in the summary structure of the memory for objects that have dump-file ID of up to or equal to K, and not larger.

In a further implementation form of the first aspect, the device is based on a double caching device.

A second aspect of the disclosure provides a method comprising storing, in one or more caches of a memory, information related to at least one object from a plurality of objects; storing, in a summary structure of the memory, at least one summary for at least one object from the plurality of objects; storing, in a volume of a storage, at least one merge file including the plurality of objects, and a set of dump-files, each dump-file being associated with a specific cache-dump operation of the one or more caches; wherein the method further comprises assigning, by a processor, to a cache from the one or more caches, a first identifier; performing, by the processor, a cache-dump operation based on generating a dump-file associated with the first identifier and storing the information related to the at least one object from the cache to the generated dump-file; and subsequently assigning, by the processor, to the cache from the one or more caches, a second identifier, wherein the second identifier is larger than the first identifier.

In an implementation form of the second aspect, the method further comprises adding the generated dump-file to the set of dump-files.

In a further implementation form of the second aspect, the method further comprises merging the set of dump-files to the at least one merge file.

In a further implementation form of the second aspect, the cache-dump operation is periodically performed at a time interval of N seconds; and/or the cache-dump operation is performed when the stored capacity of the cache reaches a predefined threshold.

In a further implementation form of the second aspect, merging is periodically performed at time intervals of M seconds; wherein M is equal to or greater than N.

In a further implementation form of the second aspect, the method further comprises, if a given dump-file storing information related to a determined object is merged from the set of dump-files to the at least one merge file, updating the at least one summary for the determined object; and associating the updated at least one summary with the identifier of the given dump-file.

In a further implementation form of the second aspect, the method further comprises, if a given cache-dump operation assigned with a given identifier changes information related to a determined object, updating the at least one summary for the determined object; and associating the at least one summary with the assigned identifier of the given cache-dump operation.

In a further implementation form of the second aspect, each summary for the at least one object comprises:
  a summary information related to the at least one object;
  an ID-1 information indicating an identifier of a dump-file for which the summary is updated; and
  an ID-2 information indicating an identifier of a cache-dump operation that changed the at least one object.

In a further implementation form of the second aspect, the method further comprises assigning each summary in the summary structure to a regular summary group representing a type of summary resulting in a non-critical error in the case of an inconsistency in the summary; or a critical summary group representing a type of summary resulting in a critical error in the case of an inconsistency in the summary.

In a further implementation form of the second aspect, the method further comprises comparing, for a determined summary, the identifier indicated in ID-1 with the identifier indicated in ID-2, and assigning, when performing the merging operation, the determined summary to the critical summary group, when determining that the identifier indicated in ID-1 is larger or equal to the identifier indicated in ID-2.

In a further implementation form of the second aspect, the method is for a double caching device.

The method of the second aspect and its implementation forms achieve all advantages and effects that are described above for the device of the first aspect and its respective implementation forms.

A third aspect of the disclosure provides a computer program product including computer program code, which, when executed by a processor, causes the method according to the second aspect or an implantation form of the second aspect to be performed.

A fourth aspect of the disclosure provide a non-transitory computer-readable recording medium that stores therein a computer program product which, when executed by a processor, causes the method according to the second aspect or an implantation form of the second aspect to be performed.

It has to be noted that all devices, elements, units and means described in the present disclosure could be implemented in the software or hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of exemplary embodiments, a specific functionality or step to be performed by external entities is not reflected in the description of a specific detailed element of that entity which performs that specific step or functionality, these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which.

DETAILED DESCRIPTION

Figure 1:
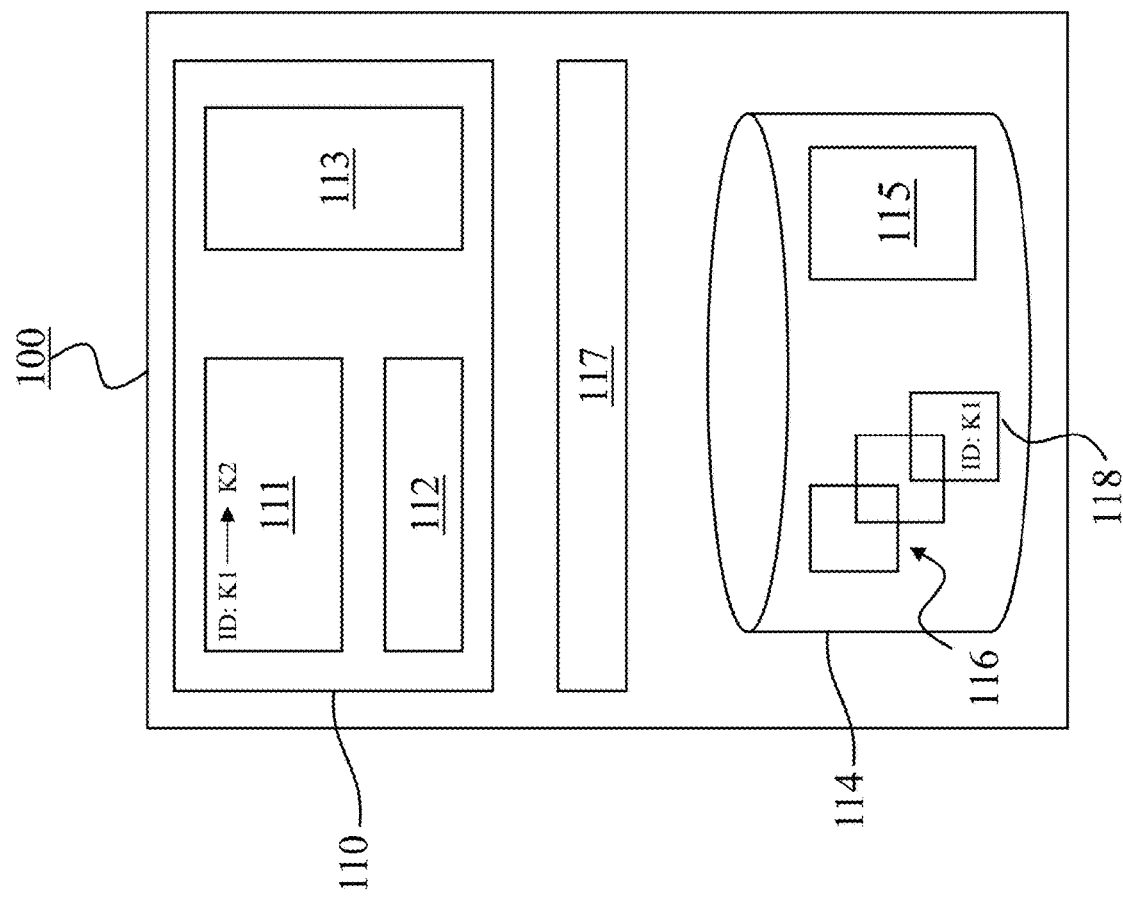
FIG. 1 is a schematic view of a device, according to an embodiment of the present disclosure.

FIG. 1 is a schematic view of a device 100, according to an embodiment of the present disclosure.

The device 100 comprises a memory 110 comprising one or more caches 111, 112 configured to store information related to at least one object from a plurality of objects, and a summary structure 113 configured to store at least one summary for at least one object from the plurality of objects; and a storage 114 comprising a volume configured to store at least one merge file 115 including the plurality of objects, and a set of dump-files 116, each dump-file being associated with a specific cache-dump operation of the one or more caches 111, 112.

The device 100 further comprises a processor 117 configured to assign, to a cache 111 from the one or more caches 111, 112, a first identifier K1; perform a cache-dump operation based on generating a dump-file 118 associated with the first identifier K1 and storing the information related to the at least one object from the cache 111 to the generated dump-file 118; and subsequently assign, to the cache 111 from the one or more caches 111, 112, a second identifier K2, wherein the second identifier K2 is larger than the first identifier K1.

For example, the first identifier K1 may be a number (e.g., K1=1) and the second identifier K2 may be a second number such as K2=K1+1 (K2=1+1=2). Therefore, the first identifier K1 may be 1 and the second identifier K2 may be 2, which is different than the first identifier. Hence, the different cache-dump operations and/or the dump-files may be identified based on their identifiers.

The device 100 may comprise a circuitry (not shown in FIG. 1) which may comprise hardware and software. The hardware may comprise analog or digital circuitry, or both analog and digital circuitry. In some embodiments, the circuitry comprises one or more processors (e.g., the processor 117) and a non-volatile memory (e.g., the memory 110) connected to the one or more processors (e.g., the processor 117). The non-volatile memory may carry executable program code which, when executed by the one or more processors, causes the device to perform the operations or methods described herein.

Figure 2:
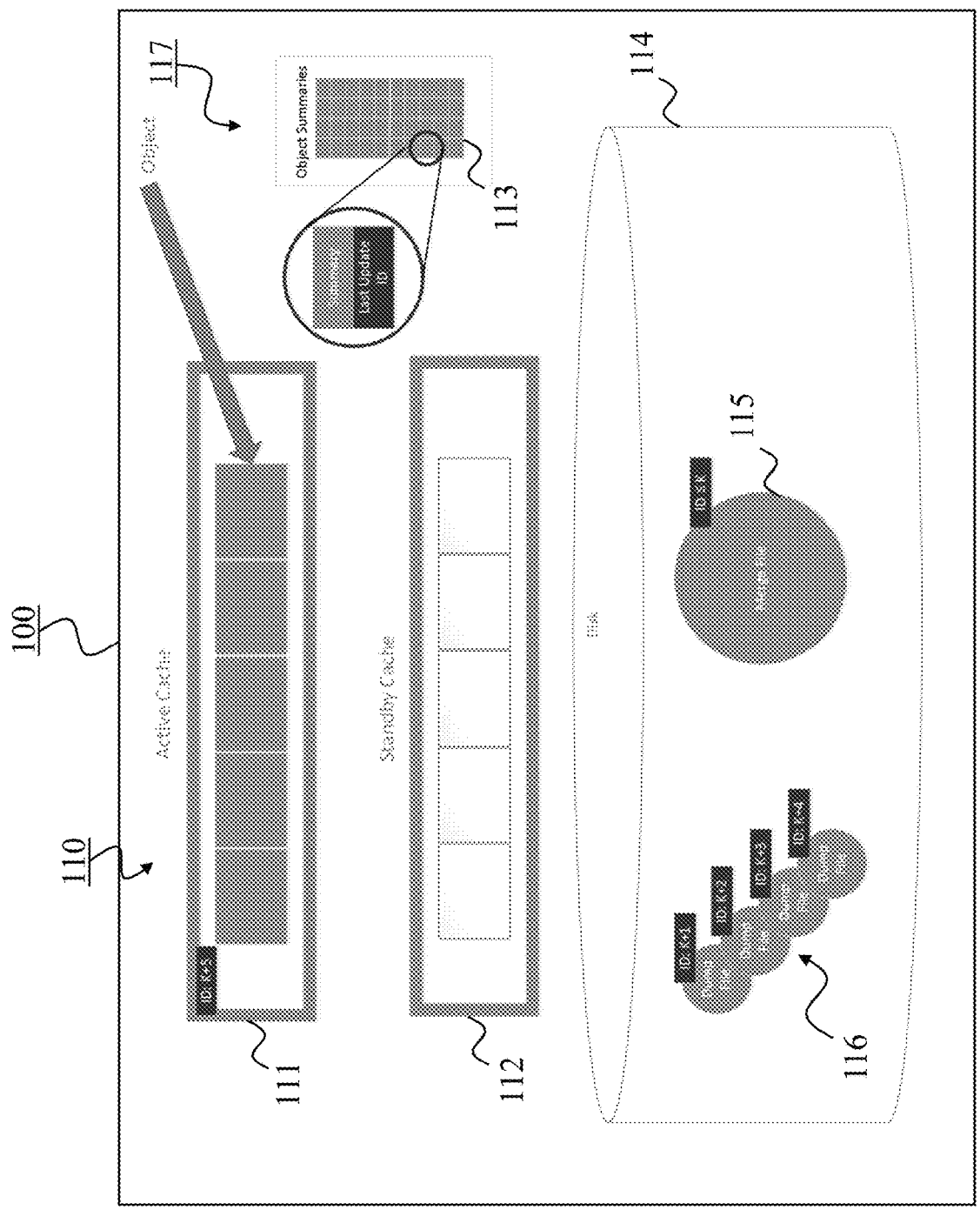
FIG. 2 is another schematic view of the device for maintaining summary consistency, according to an embodiment of the present disclosure.

Reference is made to FIG. 2 which is another schematic view of the device 100 for maintaining summary consistency, according to an embodiment of the present disclosure.

The device 100 of FIG. 2 is based on a double caching, i.e., it comprises two caches including an active cache 111 and a standby cache 112 which may be defined as two object caches in the memory 110.

The device 100 further comprises summaries (e.g., summary structure 113) of all of the objects in the memory 110.

Furthermore, the device 100 comprises the storage 114 (disk) including a list of dump-files 116, each representing a cache dump operation, and a single merge file 115 including the plurality of objects.

In the embodiment of FIG. 2, the first unmerged cache dump identifier is assumed to be K+1, for example, K may be a number. Moreover, the second identifier is assumed to be K+2. As it can be derived from FIG. 2, the device 100 constantly increases the identifiers by adding 1 to the previous identifiers, i.e., K+1, K+2, K+3, K+4, K+5, K+6, etc.

The device 100 can maintain summary consistency, for example, by using several performance-enhancing methods including one or more of:

Transaction logs, performed in order to reduce the cache size.

Holding all the object summaries in the memory 110.

Double-caching.

Swapping to storage 114 and merging in the background.

Moreover, the device 100 may divide the summaries into two types including:

Regular summary that effects the behavior of the user, but inconsistency will not result in critical errors.

Critical summary that can result in critical errors if inconsistent.

The device 100 may solve the consistency problem by assigning identifiers to caches dumped (transaction logs) and using this identifier to prevent inconsistent summary in memory. For example, each cache dump has a (unique) identifier (e.g., the IDs may constantly increase).

Moreover, the summary structure that is being held in the memory 110 for each object (the at least one summary for each object) may include three fields as follow:

1. The actual summary information (e.g., object state, ref count, etc.).
2. The ID-1 information indicating an identifier of a dump-file for which the summary is updated.
3. The ID-2 information indicating an identifier of a cache-dump operation that changed the at least one object.

In addition, when merging a cache to the on-disk structures, the at least one summary will be updated to a critical-summary information, if the last cache dump ID-2 for this object is smaller or equal to the cache dump ID-1.

Figure 3:
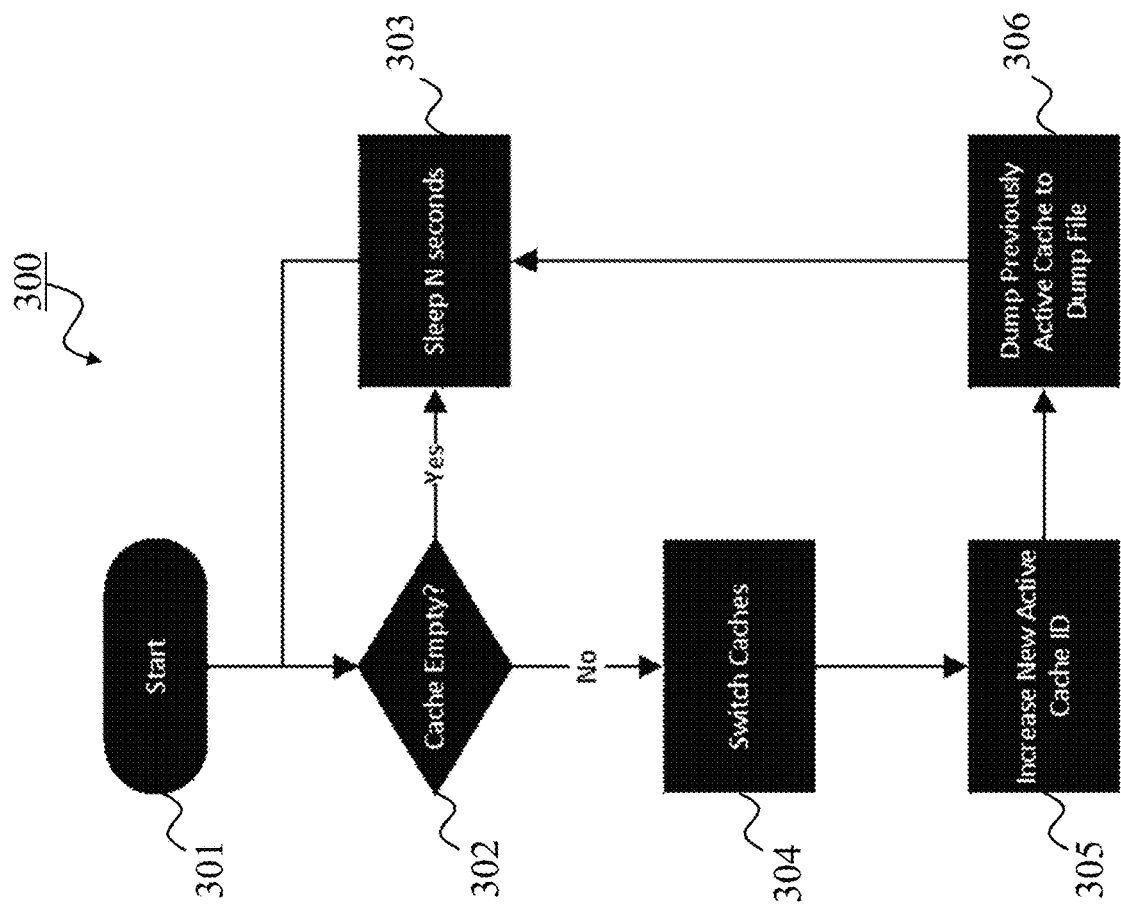
FIG. 3 is a flowchart of a method for performing a cache-dump operation on a double cache, according to an embodiment of the present disclosure.

Reference is made to FIG. 3 which is a schematic view of a method 300 for performing a cache-dump operation on a double cache, according to an embodiment of the present disclosure.

The method 300 may be performed by the device 100. The method 300 may be invoked every time period (e.g. n seconds) or when the cache is full. The device 100 may switch between the caches 111, 112, assign the new active cache a second identifier (e.g., the first identifier+1), and may further store the previous active cache to disk (while regular operations continue and use the new active cache). For example, the following operations may be performed.

At step 301, the device 100 starts the method 300.

At step 302, the device 100 determines if the cache 111 is empty or not.

At step 303, when it is determined "Yes", i.e., the cache 111 is empty, the device 100 sleeps N seconds.

At step 304, when it is determined "No", i.e., the cache 111 is not empty, the device 100 switches the caches.

At step 305, the device 100 increases the new active cache ID (i.e., assigning second identifier).

At step 306, the device 100 dumps previously active 111 to the set of dump-files.

Figure 4:
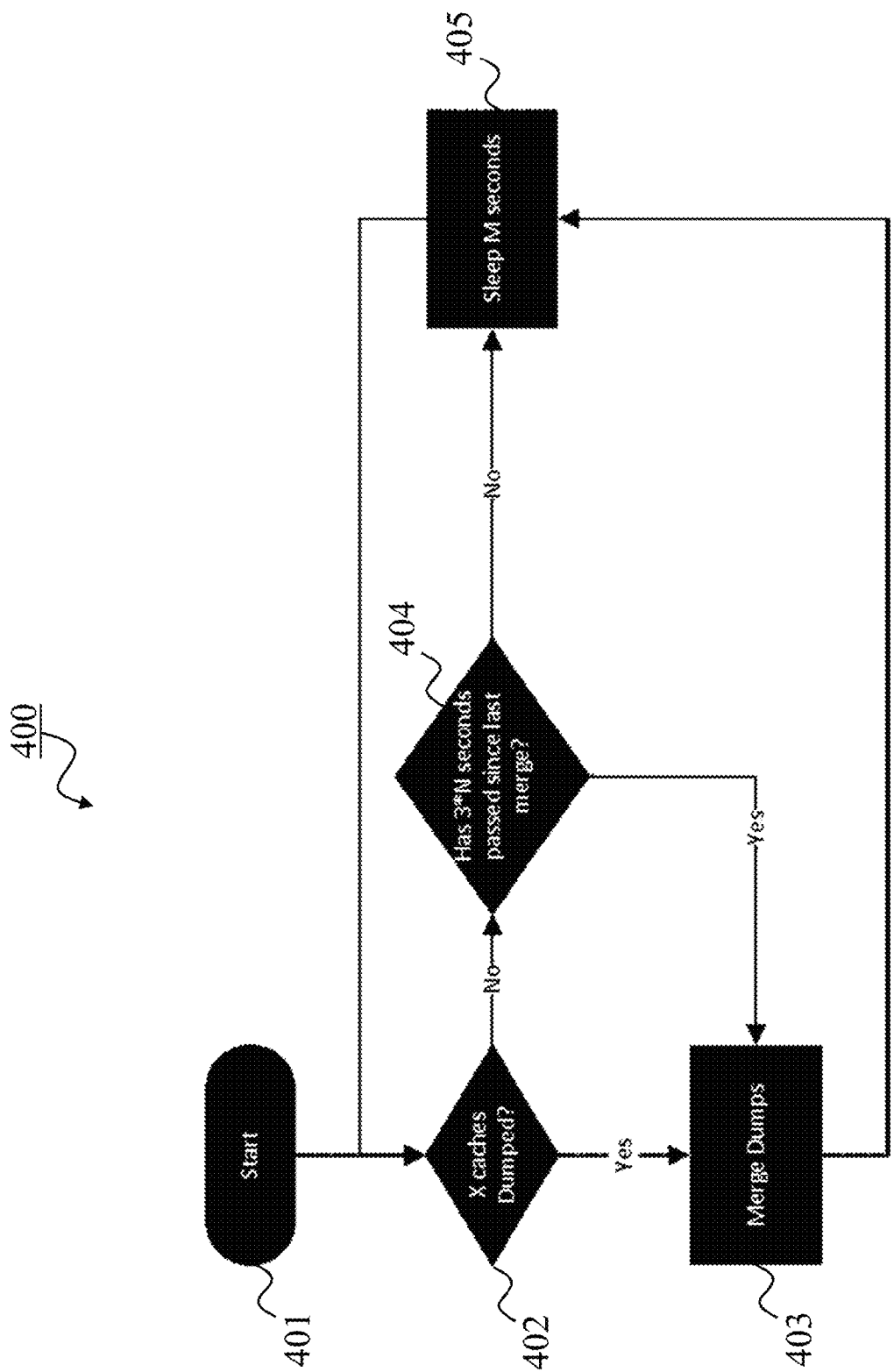
FIG. 4 is a flowchart of a method for merging the dump-files, according to an embodiment of the present disclosure.

Reference is made to FIG. 4 which is a schematic view of a method 400 for merging the dump-files, according to an embodiment of the present disclosure.

The method 400 may be carried out by the device 100, as it is described above. The method 400 may be invoked every time period (e.g., m seconds, m>>n), and if there are enough dump-files may merge them. The merge process (merging dump-files K to K+n) may be, merging all the dump-files 116 on the storage 114 into a single file 115 including all the objects and updating the summary of the object in memory 110. For example, the following operations may be performed.

At step 401, the device 100 starts the method 400.

At step 402, the device 100 determines if the caches were dumped X times (e.g., cache 111) dumped or not. Moreover, when it is determined "Yes", i.e., there are X cache dump files, the device 100 goes to step 403. However, when it is determined "No", i.e., the X caches are not dumped, the device 100 goes to step 404.

At step 403, the device 100 merges the dump-files 116 and goes to step 405.

At step 404, when it is determined "No", i.e., the X caches are not dumped, the device 100 determines if 3*N seconds passes since last merge or not. Moreover, when it is determined "Yes", i.e., 3*N seconds are passed since last merge, the device 100 goes to step 403. However, when it is determined "No", i.e., 3*N seconds are not passed since last merge, the device 100 goes to step 405.

At step 405, the device 100 sleeps M seconds and afterward goes to step 402.

Figure 5:
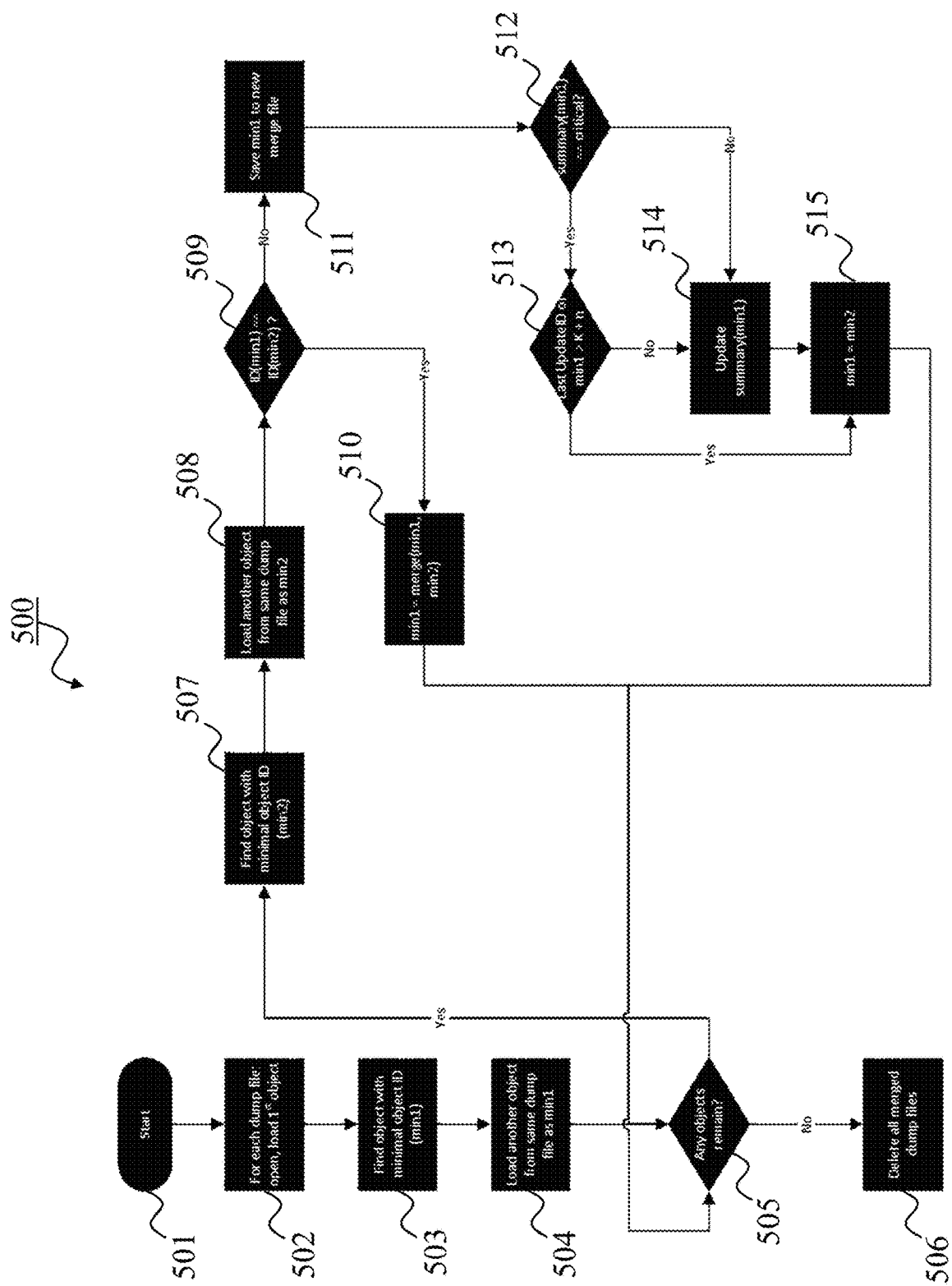
FIG. 5 is a flowchart of a method for merging dumps K to K+n, according to an embodiment of the present disclosure.

Reference is made to FIG. 5 which is a schematic view of a flowchart of a method for merging dump-files with IDs of K to K+n, according to an embodiment of the present disclosure.

The method 500 may be carried out by the device 100, as it described above. For example, the following operations may be performed.

At step 501, the device 100 starts the method 500.

At step 502, the device 100, for each dump-file that is open, loads $1^{st}$ object. For example, each object may be identified by an identifier, e.g., the object ID.

At step 503, the device 100 find object with minimal object ID (min1).

At step 504, load another object from same dump-file as min1.

At step 505, the device 100 determines if any object is remained. Moreover, when it is determined "Yes" the device 100 goes to step 507, and when it is determined "No", the device 100 goes to step 506.

At step 506, the device 100 deletes all merged dump-files.

At step 507, the device 100 finds object with minimal object ID (min2).

At step 508, the device 100 loads another object from same dump-file as min2.

At step 509, the device 100 determines if the "ID (min1)=ID (min2)". Moreover, when it is determined "Yes" the device 100 goes to step 510, and when it is determined "No", the device 100 goes to step 511.

At step 510, the device 100 performs a merging based on "min1=merge (min1, min2)". Moreover, the device 100 goes to step 505.

At step 511, the device 100 saves min1 to a new merge file.

At step 512, the device 100 determines if the "Summary (min1)=critical summary". Moreover, when it is determined "Yes" the device 100 goes to step 513, and when it is determined "No", the device 100 goes to step 514.

At step 513, the device 100 determines if the "last update ID of min1>K+n". Moreover, when it is determined "Yes" the device 100 goes to step 515, and when it is determined "No", the device 100 goes to step 514.

At step 514, the device 100 updates the summary (min1).

At step 515, it is determined that min1=min2.

Figure 6:
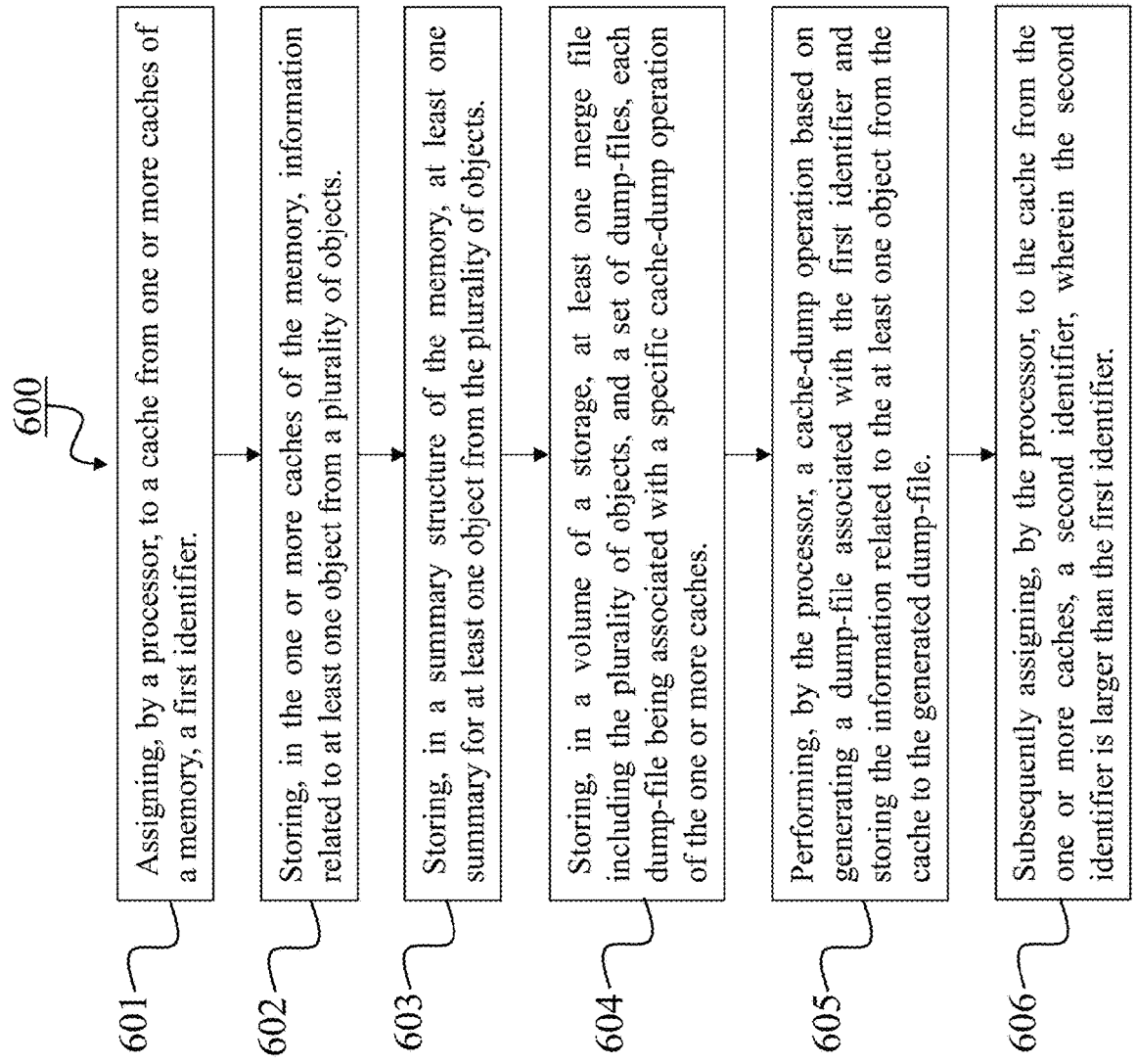
FIG. 6 is a flowchart of a method, according to an embodiment of the present disclosure.

FIG. 6 shows a method 600 according to an embodiment of the disclosure. The method 600 may be carried out by the device 100, as it described above.

The method 600 comprises a step 601 of assigning, by a processor 117, to a cache 111 from one or more caches 111, 112 of a memory 110, a first identifier K1.

The method 600 further comprises a step 602 of storing, in the one or more caches 111, 112 of the memory 110, information related to at least one object from a plurality of objects.

The method 600 further comprises a step 603 of storing, in a summary structure 113 of the memory 110, at least one summary for at least one object from the plurality of objects.

The method 600 further comprises a step 604 of storing, in a volume of a storage 114, at least one merge file 115 including the plurality of objects, and a set of dump-files 116, each dump-file being associated with a specific cache-dump operation of the one or more caches 111, 112.

The method 600 further comprises a step 605 of performing, by the processor 117, a cache-dump operation based on generating a dump-file 118 associated with the first identifier K1 and storing the information related to the at least one object from the cache 111 to the generated dump-file 118.

The method 600 further comprises a step 606 of subsequently assigning, by the processor 117, to the cache 111 from the one or more caches 111, 112, a second identifier K2, wherein the second identifier K2 is larger than the first identifier K1.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device, comprising:
   a memory comprising
      one or more caches configured to store information related to at least one object from a plurality of objects, and
      a summary structure configured to store at least one summary for at least one object from the plurality of objects;
   a storage comprising
      a volume configured to store at least one merge file comprising the plurality of objects, and a set of dump-files, each dump-file being associated with a specific cache-dump operation of the one or more caches; and
   a processor configured to:
      assign, to a cache from the one or more caches, a first identifier;
      perform a cache-dump operation based on generating a dump-file associated with the first identifier and storing the information related to the at least one object from the cache to the generated dump-file; and
      subsequently assign, to the cache from the one or more caches, a second identifier, wherein the second identifier is larger than the first identifier.

2. The device according to claim 1, wherein the processor is further configured to:
   add the generated dump-file to the set of dump-files.

3. The device according to claim 1, wherein:
   the cache-dump operation is periodically performed at a time interval of N seconds; or
   the cache-dump operation is performed based on the stored capacity of the one or more cache reaching a predefined threshold.

4. The device according to claim 1, wherein the processor is further configured to:
   based on a given cache-dump operation assigned with a given identifier changing information related to a determined object, update the at least one summary for the determined object; and
   associate the at least one summary with the assigned identifier of the given cache-dump operation.

5. The device according to claim 1, wherein
   the device is based on a double caching device.

6. The device according to claim 1, wherein the processor is further configured to:
   merge the set of dump-files to the at least one merge file.

7. The device according to claim 6, wherein:
   the merging is periodically performed at time intervals of M seconds, wherein M is equal to or greater than N.

8. The device according to claim 6, wherein the processor is further configured to:
   based on a given dump-file storing information related to a determined object being merged from the set of dump-files to the at least one merge file, update the at least one summary for the determined object; and
   associate the updated at least one summary with the identifier of the given dump-file.

9. The device according to claim 1, wherein:
   each summary for the at least one object comprises:
      a summary information related to the at least one object;
      an ID-1 information indicating an identifier of a dump-file for which the summary is updated; and
      an ID-2 information indicating an identifier of a cache-dump operation that changed the at least one object.

10. The device according to claim 9, wherein the processor is further configured to:
    assign each summary in the summary structure to:
       a regular summary group representing a type of summary resulting in a non-critical error based on an inconsistency in the summary; or
       a critical summary group representing a type of summary resulting in a critical error based on an inconsistency in the summary.

11. The device according to claim 10, wherein the processor is further configured to:
    compare, for a determined summary, the identifier indicated in ID-1 with the identifier indicated in ID-2; and
    assign, while performing a merging operation, the determined summary to the critical summary group based on determining that the identifier indicated in ID-1 is equal to or larger than the identifier indicated in ID-2.

12. A method, comprising:
    assigning, by a processor, to a cache from one or more caches of a memory, a first identifier;
    storing, in the one or more caches of the memory, information related to at least one object from a plurality of objects;
    storing, in a summary structure of the memory, at least one summary for at least one object from the plurality of objects;
    storing, in a volume of a storage, at least one merge file including the plurality of objects, and a set of dump-files, each dump-file being associated with a specific cache-dump operation of the one or more caches;

performing, by the processor, a cache-dump operation based on generating a dump-file associated with the first identifier and storing the information related to the at least one object from the cache to the generated dump-file; and subsequently assigning, by the processor, to the cache from the one or more caches, a second identifier, wherein the second identifier is larger than the first identifier.

13. The method according to claim 12, further comprising:

adding the generated dump-file to the set of dump-files.

14. The method according to claim 12, further comprising:

updating the at least one summary for a determined object based on a given cache-dump operation assigned with a given identifier changing information related to the determined object; and associating the at least one summary with the assigned identifier of the given cache-dump operation.

15. The method according to claim 12, further comprising:

merging the set of dump-files to the at least one merge file.

16. The method according to claim 15, further comprising:

updating the at least one summary for a determined object based on a given dump-file storing information related to the determined object being merged from the set of dump-files to the at least one merge file; and associating the updated at least one summary with the identifier of the given dump-file.

17. The method according to claim 12, wherein:

each summary for the at least one object comprises:

a summary information related to the at least one object;

an ID-1 information indicating an identifier of a dump-file for which the summary is updated; and an ID-2 information indicating an identifier of a cache-dump operation that changed the at least one object.

18. The method according to claim 17, further comprising:

assigning each summary in the summary structure to:

a regular summary group representing a type of summary resulting in a non-critical error based on an inconsistency in the summary; or a critical summary group representing a type of summary resulting in a critical error based on an inconsistency in the summary.

19. The method according to claim 18, further comprising:

comparing, for a determined summary, the identifier indicated in ID-1 with the identifier indicated in ID-2; and assigning, while performing a merging operation, the determined summary to the critical summary group based on determining that the identifier indicated in ID-1 is equal to or larger than the identifier indicated in ID-2.

* * * * *